United States Patent

Kinugawa et al.

[11] 4,237,838
[45] Dec. 9, 1980

[54] ENGINE AIR INTAKE CONTROL SYSTEM

[75] Inventors: Masumi Kinugawa; Hideya Fujisawa; Norio Omori; Motoharu Sueishi, all of Kariya, Japan

[73] Assignee: Nippondenso Co., Ltd., Kariya, Japan

[21] Appl. No.: 1,353

[22] Filed: Jan. 4, 1979

[30] Foreign Application Priority Data

Jan. 19, 1978 [JP] Japan .................................. 53/4872

[51] Int. Cl.³ .......................... F02D 1/04; F02B 75/10
[52] U.S. Cl. .................... 123/327; 123/339; 123/587
[58] Field of Search ....... 123/119 EC, 32 EE, 32 EL, 123/119 D, 124 A, 124 R, 124 B, 32 EA, 102, 97B, 119 F; 60/276, 285

[56] References Cited

U.S. PATENT DOCUMENTS

| | | | |
|---|---|---|---|
| 3,931,710 | 1/1976 | Härtel | 123/124 R |
| 3,964,457 | 6/1974 | Coscia | 123/119 F |
| 4,037,406 | 7/1977 | Härtel | 60/276 |
| 4,057,042 | 11/1977 | Aono | 123/119 EC |
| 4,146,000 | 3/1979 | Hattori et al. | 123/119 EL |
| 4,147,030 | 4/1979 | Katahira et al. | 60/276 |

Primary Examiner—Charles J. Myhre
Assistant Examiner—Raymond A. Nelli
Attorney, Agent, or Firm—Cushman, Darby & Cushman

[57] ABSTRACT

A system for controlling the amount of air taken in by an engine comprises an air duct tube bypassing a throttle valve of an intake tube for taking in air supplied to an automobile engine, a plurality of valves for regulating the amount of air passing through the air duct tube, and control device therefor. The amount of air in the bypass is controlled in accordance with the temperature and number of revolutions of the engine and the air intake pressure downstream of the throttle valve. During the idling of the engine, the air intake control system generates a signal representing the standard engine idling revolutions in accordance with the engine temperature, compares the actual engine revolutions with a reference, and regulates the amount of air flowing in the bypass by use of the results of a comparison, thus rendering the actual engine revolutions identical to the reference. During the loaded engine operation, by contrast, the amount of bypass air is so controlled that the air intake pressure downstream of the throttle valve is maintained at predetermined constant value.

14 Claims, 5 Drawing Figures

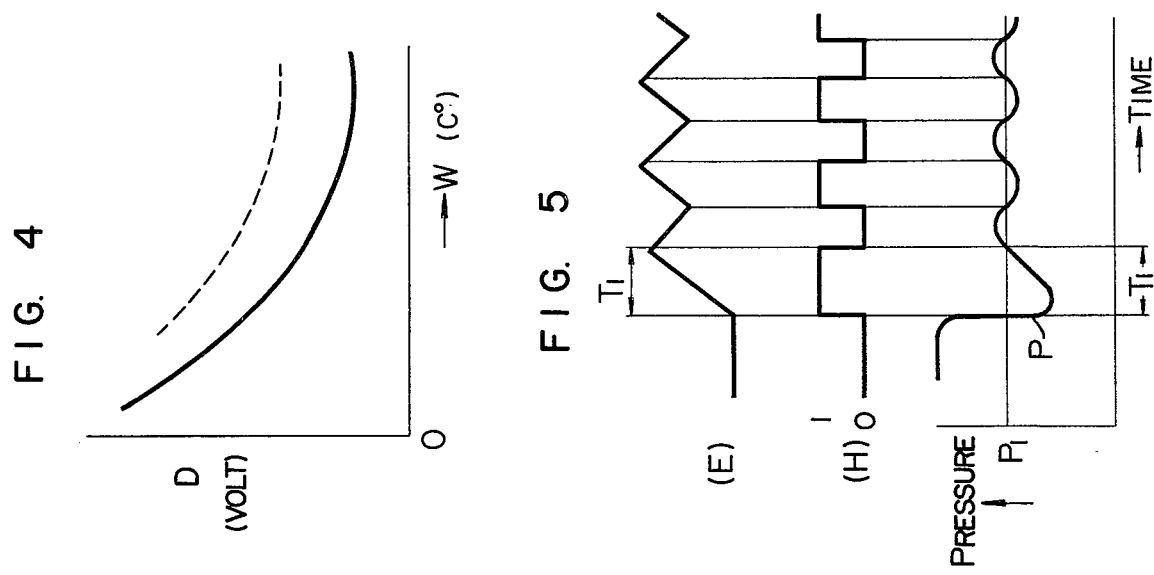

ENGINE AIR INTAKE CONTROL SYSTEM

BACKGROUND OF THE INVENTION

This invention relates to a system for controlling the air intake of an engine, or more in particular to a system for controlling the idling speed of engine revolutions and the pressure in its air intake tube at the time of deceleration for a spark-ignition type of engine.

Generally, in the idling operation of a spark-ignition type of engine that is cold, viscosity of the lubricant is high and therefore friction loss is large. Thus more air than when the engine is warm is supplied to the engine to enable the engine to run against the friction and preferably the number of revolutions or engine speed is maintained high in order to shorten the warm-up period.

In a known system to achieve this purpose, an air duct tube bypassing the throttle valve is provided with a bi-metal air control valve midway thereof. In accordance with the engine temperature, the amount of air flowing through the duct tube is controlled, thus controlling the engine speed.

If the pressure in the air intake tube is reduced at the time of deceleration, pressure at the time of ignition in the engine combustion chamber is reduced, with the result that the fuel is fired erroneously, thereby discharging a great amount of harmful HC gases into the atmosphere. In the case where the exhaust system includes a catalyst reactor as an exhaust gas purifier, a great amount of HC reacts in the catalyst reactor, and the resulting heat of reaction overheats the catalyst reactor, often causing it to melt.

According to a known method for obviating such a problem, a special device having a diaphragm valve is mounted by which when the pressure in the air intake tube is reduced below a predetermined level, additional air is supplied into the engine, thus preventing the pressure in the air intake tube from decreasing below the setting.

In the above-mentioned engine speed control system, only the engine temperature is used as a control parameter. Therefore, the disadvantage is that when different types of engine lubricant are involved, the difference in lubricant viscosity makes it impossible to attain a high design speed or results in an engine speed higher than the design speed.

Another disadvantage of the above-mentioned conventional system is that since the engine speed control system and the air intake tube pressure control device for deceleration are mounted separately from each other, a larger mounting space is required. This necessitates the use of more air duct tubes and increases the cost of the system.

SUMMARY OF THE INVENTION

The present invention has been developed in view of the above-described shortcomings of the conventional systems. The engine intake air control system according to the present invention comprises an air duct tube bypassing a throttle valve of the air intake tube for taking in the air to be supplied to the engine, valves for regulating the amount of air flowing through the air duct tube, and a control device therefor. The idling or loaded operation of the engine is discriminated by the opening of the throttle valve. During the idling operation, a signal representing a reference number of revolutions depending on the engine temperature is generated, the actual engine speed is compared with the reference speed, and by use of the result of comparison, the amount of air flowing through the bypass is controlled so that the engine revolutions are rendered identical to the reference revolutions. In the case of a loaded operation, on the other hand, the amount of air in the bypass is controlled in accordance with the air intake pressure downstream of the throttle valve, thus maintaining constant the air intake pressure downstream of the throttle valve.

An object of the present invention is to provide an engine air control system able to accurately control the engine idling speed for different types of engine lubricants and at the same time to prevent the pressure in the air intake tube from decreasing below a predetermined level, resulting in a reduced mounting space and cost.

According to the present invention, the engine idling speed is properly controlled in accordance with the warm-up condition of the engine and the on-off state of the air conditioner. At the time of deceleration, the pressure in the air intake tube is prevented from dropping below the predetermined level. Further, the need for a plurality of control devices which are provided for different purposes in the conventional system is eliminated. Due to these great advantages, both the mounting space and cost are reduced, design freedom is improved, and thus the number of component parts is reduced for an improved reliability.

Also, by the use of closed loop control in which the idling speed is controlled by comparing the actual speed with a desired speed setting, the engine operation is not affected by various external factors including difference in viscosity of engine oil, thus making it possible to control the engine speed stably as intended by the design engineers.

Furthermore, if an integrator circuit is used as the circuit for generating a control signal associated with the engine speed, the control speed is increased the greater, the larger the deviation of the engine speed from the speed setting, resulting in the advantage that the actual speed is corrected to attain the set speed stably and sensitively.

BRIEF DESCRIPTION OF THE DRAWINGS

FIG. 3 is a diagram showing signal waveforms produced at various parts in FIG. 2.

FIGS. 4 and 5 are characteristics diagrams for explaining the operation of the system shown in FIG. 1.

DESCRIPTION OF THE PREFERRED EMBODIMENTS

Figure 1:
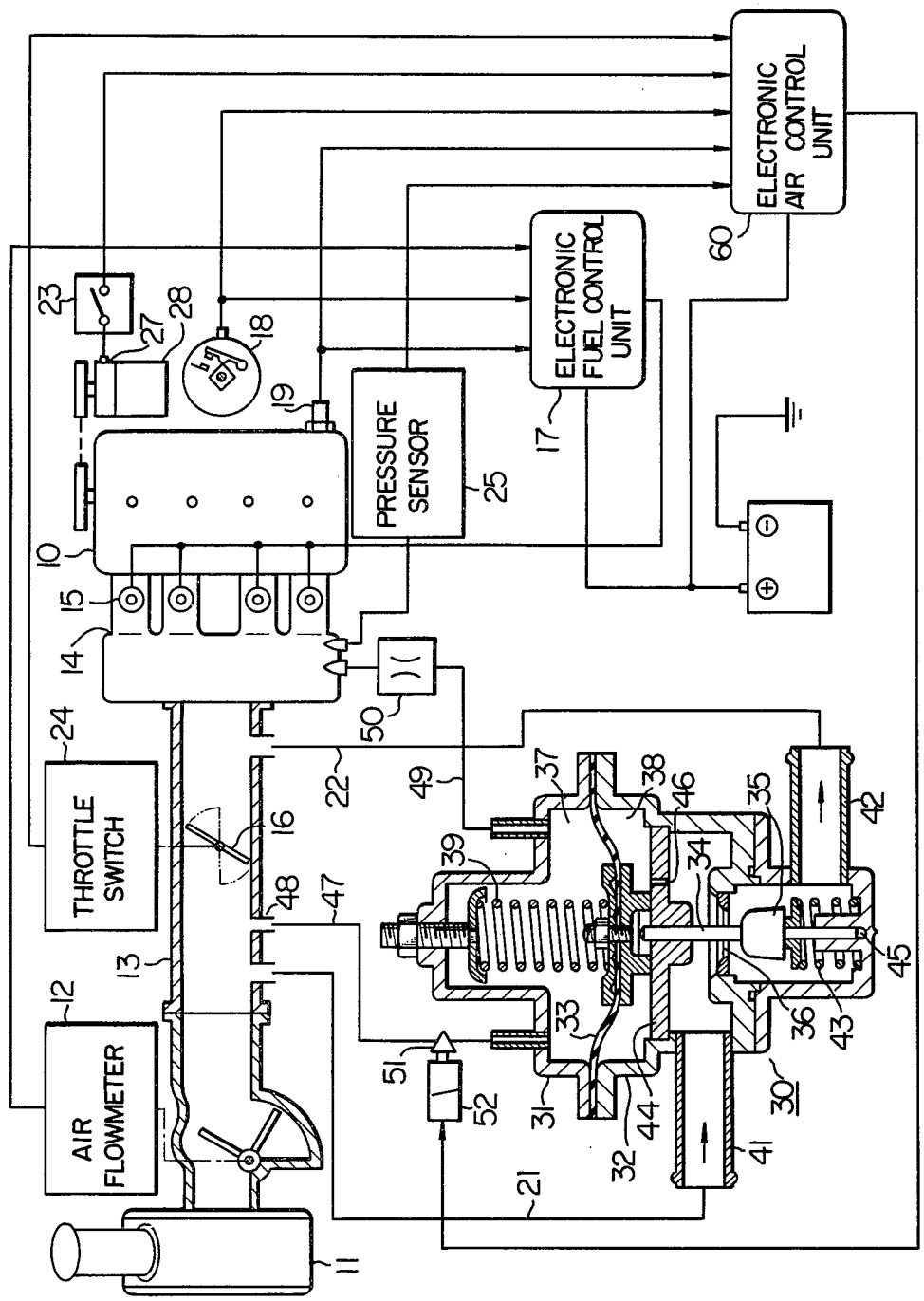
FIG. 1 is a diagram showing the configuration of an embodiment of the system according to the present invention.

This invention will be explained below with reference to an embodiment shown in the drawings. In FIG. 1, reference numeral 10 shows a known engine of four-cycle spark ignition type for an automobile, which takes in air through an air cleaner 11, an air flowmeter 12, an air intake tube 13 and an intake manifold 14, while fuel such as gasoline is supplied by injection from an electromagnetic fuel injection valve 15 provided on the intake manifold 14. Also, the exhaust gas from the engine 10 is discharged into atmosphere through a catalyst reactor and a quenching muffler neither of which are shown in the drawings. The amount of air taken in by the engine 10 is regulated by the throttle valve 16 operated as desired. The amount of fuel injected is adjusted by the electronic fuel control unit 17. The electronic fuel control unit 17 is a known device for determining the amount of fuel to be injected from basic parameters including the engine revolution speed detected by the ignition distributor 18 functioning as an engine speed sensor, and the amount of the air taken in as measured by the air flowmeter 12. Signals from the engine warm-up sensor 19 for detecting the temperature of the engine cooling water are also applied to the electronic fuel control unit 17, thus increasing or decreasing the amount of fuel injection.

The air duct tubes 21 and 22 are provided in a manner to bypass the throttle valve 16. Between the duct tubes 21 and 22, an air control valve 30 is provided for regulating the auxiliary air taken in. An end of the duct tube 21 is connected to the air inlet provided between the throttle valve 16 and air flowmeter 12, while an end of the duct tube 22 is connected to the air outlet provided downstream of the throttle valve 16.

The air control valve 30 is of diaphragm control type for transmitting the vibrations of the diaphragm 33 with the periphery thereof inserted between the housings 31 and 32, to the valve body secured to the shaft 34, thus opening or closing the valve seat 36. The diaphragm 33 is displaced by the pressure difference between diaphragm chamber 37 and atmospheric pressure chamber 38 and energized by the compression coil spring 39 through a spring support, thus providing the valve-opening force for the valve body 35.

The valve body 35 is essentially a needle valve acting in such a manner that the distribution area formed by it and the valve seat 36 is continuously changed in accordance with the displacement of the diaphragm 33, i.e., the pressure of the chamber 37, thus controlling the amount of air flowing from the inlet pipe 41 to the outlet pipe 42. The valve body 35 is arranged in reverse way to an ordinary needle valve so that it is opened with the increase in the pressure of the chamber 37 and closed with the decrease in the pressure of the chamber 37.

The valve body 35 is provided with the valve-opening force from the comparatively weak coil spring 43 through the spring support and the shaft 34.

A holding plate 44 is secured to the housing 32. The shaft 34 is guided by the holding plate 44 and the support 45 of the housing. Atmospheric air is introduced into the atmospheric pressure chamber 38 through the small hole 46.

For introducing the atmospheric pressure, the diaphragm chamber 37 is connected to the port 48 upstream of the throttle valve 16 through the tube 47. Also for introducing a negative pressure, the diaphragm chamber 37 is connected to the intake manifold 14 downstream of the throttle valve 16 through the tube 49 and the constricting section 50. Midway of the tube 47, there is provided an electro-magnetic valve mechanism or an electromagnetic valve 51 for controlling the opening of the air control valve 30 by opening or closing the tube 47.

The electromagnetic valve 51 is connected to the electronic air control unit 60 for controlling the magnetic excitation thereof. The electronic air control unit 60 is connected to the distributor 18, the engine warm-up sensor 19, the air-conditioning switch 23, the throttle switch 24 for detecting the closed-up state or a slight opening in the neighbourhood thereof of the throttle valve 16, and the pressure sensor 25 for detecting the pressure in the intake manifold downstream of the throttle valve 16. The electronic air control unit 60 is impressed with an engine speed signal, a cooling water temperature signal, a throttle signal, an air-conditioner on-off signal and an air intake tube pressure signal.

The air-conditioning switch 23 is for operating the air conditioner of the automobile. When this switch 23 is turned on, the electromagnetic clutch 27 is actuated with the result that the compressor 28 for the air conditioner is connected as a load of the engine 10. The pressure sensor 25 is comprised, for example, of a switch untilizing a diaphragm and turned on to produce a "1" signal when the air intake tube pressure is reduced below a predetermined value, say, −500 mmHg (assuming that the atmospheric pressure is 0 mmHg) as at the time of engine deceleration.

Figure 2:
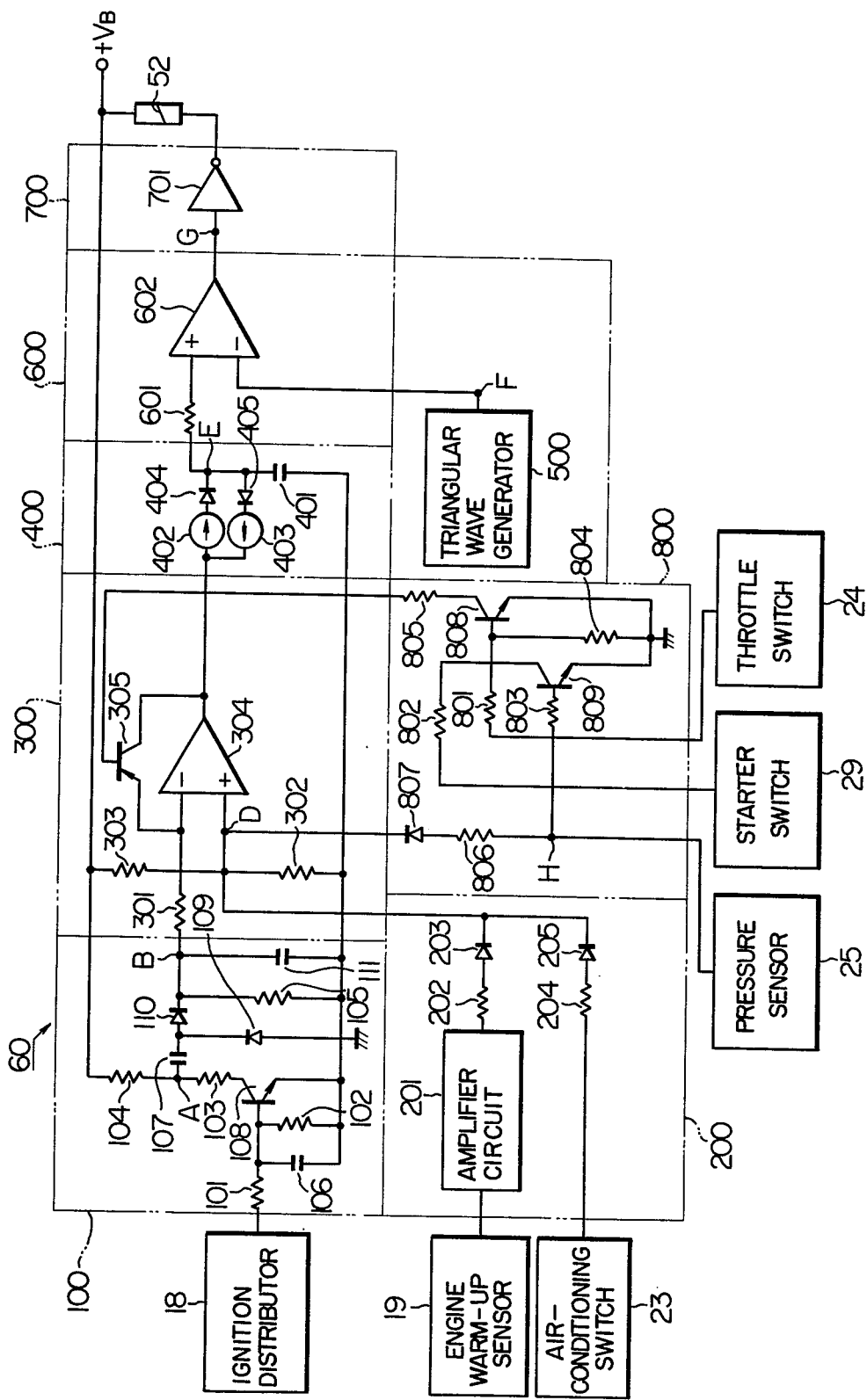
FIG. 2 is an electrical circuit diagram showing the electronic air control unit included in FIG. 1.

The electronic air control unit 60 will be described in detail below with reference to FIG. 2. The D-A converter 100 is impressed with an ignition pulse signal synchronous with the engine rotation from the ignition distributor 18. The waveform of this signal is shaped as shown in (A) of FIG. 3 by the waveform shaping section including the resistors 101, 102, 103 and 104, the capacitor 106 and the transistor 108. The pulse signal thus shaped in waveform is D-A converted by the capacitors 107 and 111 and the diodes 109 and 110, thus producing at the terminal B a voltage as shown in (B) of FIG. 3, which is the result of superimposition of an analog DC voltage proportional to the engine speed on a saw-tooth voltage of a frequency synchronous with the engine speed (intermittent signal). The function voltage generator circuit 200 is impressed with the output signal of the engine warm-up sensor 19 and the on-off signal of the air-conditioning switch 23. The output of the engine warm-up sensor 19 is amplified by a known amplifier circuit 201 and thus converted into a voltage signal corresponding to the engine warm-up condition. This voltage signal is applied to the first comparator circuit 300 via the resistor 202 and the diode 203, while the on-off signal from the air-conditioning switch 23 is applied to the first comparator circuit 300 via the resistor 204 and the diode 205, thus supplying a function voltage (with reference level of D) to the first comparator circuit 300.

The first comparator circuit 300 is comprised of the resistors 301, 302 and 303, the comparator 304 and the transistor 305 connected between the reversing input terminal and the output terminal of the comparator 304. The first comparator circuit 300 thus compares the output voltage of the D-A converter 100 with the function voltage (with reference level of D) of the function voltage generator circuit 200. The output characteristics of the function voltage generator circuit 200 are such that as shown in FIG. 4, the lower the engine temperature W, the larger the output voltage thereof. When the air-conditioning switch 23 is off, the output of the circuit 200 takes the form as shown by the solid line in FIG. 4, and when the air-conditioning switch 23 is turned on, the output voltage is increased as shown by the dashed line in FIG. 4. Only as long as the output voltage of the D-A converter 100 is lower than the reference level D, the comparator circuit 300 produces signal C of "1" level as shown in (C) of FIG. 3.

The integrator circuit 400 is for charging or discharging at constant current the capacitor 401 in response to the signal C, and comprises the constant-current circuits 402 and 403 and the diodes 404 and 405. As long as the output signal C of the comparator circuit 300 is at "1" level, the capacitor 401 is charged at constant current and therefore the output voltage E of the integrator circuit 400 increases as shown by the dashed line in (E) of FIG. 3; while as long as the output voltage is at "0" level, the capacitor 401 is discharged at constant current and therefore the output voltage E is decreased.

The triangular wave oscillator 500 is a known device for producing the triangular wave voltage F of regular cycles as shown by the solid line in (E) of FIG. 3.

The second comparator circuit 600 is for comparing the output voltage E of the integrator circuit 400 with the triangular wave voltage F of the oscillator 500 applied thereto, and comprises the resistor 601 and the comparator 602. This circuit 600 produces a pulse signal G which is maintained at "1" level only as long as the output voltage E of the integrator circuit 400 is higher than the triangular wave voltage F as shown in (G) of FIG. 3.

The amplifier circuit 700 is a known device for amplifying the output signal G of the second comparator circuit 600. The amplified output of the circuit 700 is applied to the electromagnetic coil 52 of the electromagnetic valve 51 making up an electromagnetic mechanism.

The command circuit 800 is connected to the throttle switch 24, the pressure sensor 25 and the starter switch 29 for generating a "1" level signal only when the starter for starting the engine 10 is driven. The command circuit 800 comprises the resistors 801 to 806, diode 807, and transistors 808 and 809. The collector of the transistor 808 is connected via the resistor 805 to the transistor 305 of the first comparator circuit 300. When a "1" level signal is applied from the throttle switch 24 or starter switch 29, the transistor 808 conducts, thus causing the transistor 305 of the first comparator circuit 300 to conduct. Thus, the comparator 304 of the first comparator circuit 300 is operated as an impedance converter.

When a "1" level signal is applied from the pressure sensor 25, on the other hand, the transistor 809 is turned on, so that the transistor 808 is turned off irrespective of the output signal of the throttle switch 24, while the comparator 304 acts as a comparator. At the same time, the output signal of the pressure sensor 25 is applied to the terminal D through the resistor 806 and diode 807, thereby increasing the voltage of reference level D and producing a "1" level signal at the output of the comparator 304.

Circuits 100, 300, 400, 500, 600 and 700 make up a closed loop control circuit.

Operation of the above-mentioned system will be described below. Assume that the engine 10 is idling with the throttle valve 16 closed. If the idling speed is lower than the speed setting corresponding to the function voltage (reference level D) determined by the function voltage generator circuit 200 of the electronic air control unit 60, the output of the D-A converter 100 is also reduced with respect to the reference level D. As a result, the output of the D-A converter 100 is always lower or only slightly higher than the reference level D as shown at the central part in (B) of FIG. 3. Therefore, the output signal of the first comparator circuit 300, as shown at the central part of (C) of FIG. 3, is always at "1" level, or at "0" level for a very short period of time. Thus the output voltage E of the integrator circuit 400 increases as shown by dashed line at the central part of (E) of FIG. 3.

As a result, in the second comparator circuit 600, the period T for which the integrated voltage E is higher than the triangular wave voltage F of the oscillator 500, i.e., the period for which the comparator 602 produces a "1" level signal is lengthened, and the proportion of time for which power is supplied to the electromagnetic coil 52 of the electromagnetic valve 51 is increased. In other words, the opening of the air control valve 30 is increased, with the result that the amount of auxiliary air bypassing the throttle valve 16 is increased, thus increasing the speed of the engine 10.

When the engine speed is higher than the set speed, on the other hand, the output of the D-A converter 100 is always higher or slightly lower than the reference level D representing the set speed as shown on the right side of (B) of FIG. 3. Also, the output signal of the first comparator circuit 300 is always at "0" level or at "1" level for a very short period of time as shown on the right side of (C) in FIG. 3. As a result, the output voltage E of the integrator circuit 400 decreases as shown by the dashed line on the right side in (E) of FIG. 3.

Thus, in the second comparator circuit 600, the period of time T during which the integrated voltage E is higher than the triangular wave voltage F of the oscillator 500 (i.e., the period for which the output of the comparator 60 is "1" signal) is reduced, so that the proportion of time for which the electromagnetic coil 52 of the electromagnetic valve 51 is energized is reduced. As a result, the opening of the air control valve 30 is lessened, and the amount of auxiliary air bypassing the throttle valve 16 decreases, thereby reducing the speed of the engine 10.

In this way, during the idling operation with the throttle valve 16 closed, the engine speed is regulated by the electronic air control unit 60 at the set speed corresponding to the reference level D determined by the output of the function voltage generator circuit 200. As shown by the solid line in FIG. 4, the reference level D on which the set speed depends is higher, the lower the engine temperature W in accordance with the output of the engine warm-up sensor 19. During the engine warm-up, therefore, the engine speed is increased in accordance with the engine temperature W, thus making possible stable idling operation. Further, when the air-conditioning switch 23 is turned on with the compressor 27 for the automobile cooler or like connected to the engine 10, the ON signal of the air-conditioning switch 23 is applied to the function voltage generator circuit 200, which raises the reference level D as shown by dashed line in FIG. 4, thus changing the set speed upward. As a result, the compressor 27 is driven at a sufficiently large driving force without any engine stall.

Now, assume that the engine 10 transfers from idling to loaded run with the throttle valve 16 opened. The transistor 808 of the command circuit 800 is turned on, so that the transistor 305 of the first comparator circuit 300 conducts. The comparator 304 of the first comparator circuit 300 thus operates as an impedance converter. The output voltage of the function voltage generator circuit 200, i.e., the reference level D is directly produced from the impedance converter. The output voltage of the integrator circuit 400 approximates the reference level D. Thus the second comparator circuit 600 produces a pulse signal G of predetermined width associated with the reference level D of the function voltage generator circuit 200. The air control valve 30 supplies a predetermined amount of auxiliary air associated with the engine temperature W bypassing the throttle valve 16. This results in the advantages mentioned below.

Generally, the engine speed is higher in loaded operation than in idling operation. Therefore, if the speed control is effected without the command circuit 800, the auxiliary air duct tubes 21 and 22 are closed so that no auxiliary air is supplied. At the time of transfer from loaded to idling run, the engine speed is reduced temporarily below the set speed, thus causing an engine stall or unstable engine condition until the set speed is attained. In the embodiment under consideration, however, such a problem is eliminated for the reason that during the loaded run when the throttle valve 16 is opened, a predetermined amount of auxiliary air is supplied in accordance with the engine condition (or engine temperature in this embodiment).

According to the embodiment under consideration, when the starter is driven to start the engine, the starter switch 29 produces a "1" level signal. In this case, like in the above-mentioned case where the throttle valve 16 is opened, the transistor 808 of the command circuit 800 conducts and issues a command. Thus the output of the integrator circuit 400 approximates that of the function voltage generator circuit. In other words, the second comparator circuit 600 produces a pulse signal of predetermined pulse width in accordance with the engine condition or engine temperature in this case while maintaining the amount of auxiliary air constant in accordance with the engine condition, thus improving the engine starting characteristics.

Further, at the time of automobile deceleration, the throttle valve 16 is closed at high engine speed. When the pressure P of the air intake tube is reduced below the predetermined value P1 as shown in FIG. 5, the pressure sensor 25 produces a "1" level signal as shown in (H) of FIG. 5. The transistor 809 is turned on, and the transistor 808 is turned off in the absence of the signal from the throttle switch 24. At the same time, the voltage level at the input terminal D of the comparator 304 is raised, so that the output signal of the comparator 304 is maintained at "1" level without regard to the output signal of the D-A converter 100.

Thus the output signal of the integrator circuit 400 increases as shown for the period T1 in (E) of FIG. 5. In the second comparator circuit 600, the period of time T when the integrated voltage E is higher than the triangular wave voltage F of the oscillator 500 is increased, so that the proportion of time for which the electromagnetic coil 52 is energized is increased. The result is that the opening of the air control valve 30 is increased, thus increasing the amount of auxiliary air and the pressure P of the air intake tube downstream of the throttle valve 16.

When the pressure P of the air intake tube is increased beyond the predetermined level, the pressure sensor 25 produces a "0" level signal. As a result, as long as the throttle switch 24 is off, the reference level D is reduced to the level determined by the output signals of the engine warm-up sensor 19 and the air-conditioning switch 23, and therefore the output signal of the comparator 304 is reduced to "0" level, thus reducing the output voltage E of the integrator circuit 400. Also when the throttle switch 24 is on, the output voltage E is decreased. The proportion of time of energization of the electromagnetic coil 52 is reduced, so that the opening of the air control valve 30 is lessened, thus reducing both the amount of auxiliary air and the pressure P of the air intake tube. When the pressure P of the air intake tube is reduced below the predetermined value P1, the pressure sensor 25 produces again a "1" level signal, thus repeating the above-mentioned processes of operation.

In this way, at the time of automobile deceleration, the pressure P of the air intake tube is substantially regulated at predetermined value P1 and not reduced considerably below that level, thereby reducing the amount of HC exhaust or preventing the overheat of the catalyst reactor.

In the above-mentioned embodiment, the function voltage from the function voltage generator circuit 200 is controlled by the command circuit 800 in such a manner that energization of the electromagnetic valve 51 is controlled at the time of automobile deceleration. Instead, the output level of the triangular wave oscillator 51 may be controlled or the output signal of the amplifier circuit 700 may be directly controlled.

Also in place of the diaphragm valve used as an air control valve for controlling the auxiliary air and the electromagnetic valve as an electromagnetic mechanism in the above-mentioned embodiment, a combination of a butterfly valve and a motor such as a pulse motor or a combination of a needle valve and an electromagnetic actuator with the plunger displaced by an electromagnetic coil may be used alternatively.

In such a case, the output signal of the integrator circuit 400 is connected to a known driving circuit to drive the electromagnetic mechanism.

Further, although the amount of auxiliary air supply is controlled by causing it to bypass the throttle valve in the embodiment described above, the throttle valve itself may act as an air control valve. In this case, the system is so constructed that the air of an amount associated with the closed-up state of the throttle valve is supplied to the engine, and the closed-up state of the throttle valve is controlled by the electromagnetic mechanism.

We claim:

1. In an engine system having throttle means for controlling the amount of air flowing into an engine, an air passage bypassing the throttle means, air control valve means within said bypassing air passage for controlling the flow of air bypassing the throttle means, and fuel supply means for supplying said engine with fuel in accordance with the whole amount of air flowing into said engine through both the throttle means and the bypassing air passage, an apparatus for controlling air flowing into said engine comprising:

temperature detecting means for detecting the temperature of said engine;

speed detecting means for detecting the rotation speed of said engine and generating a rotation speed signal proportional thereto;

reference generating means for generating a reference speed signal representative of a desired idling rotation speed of said engine in response to said temperature detected by said temperature detecting means;

comparing means for comparing said rotation speed signal generated by said speed detecting means with said reference speed signal generated by said reference generating means and providing a comparator signal for controlling said control valve means thereby controlling the amount of air bypassing the throttle means so as to cause the idling rotation speed to be kept at the desired idling rotation speed;

throttle detecting means for detecting the closing and opening of said throttle means;

first control means responsive to said throttle detecting means for allowing and preventing the operation of said air control valve means by said comparing means;

pressure detecting means for detecting the intake pressure present downstream of said throttle means; and second control means for causing said air control valve means to increase and decrease the amount of bypass air in response to the output of said pressure detecting means indicative of said intake pressure being below and above a predetermined value, respectively, said second control means providing a control of said air control valve overriding the control provided by said first control means.

2. An apparatus according to claim 1 further comprising air-conditioning detecting means for detecting the engagement and disengagement of an air-conditioning apparatus with and from said engine, respectively, and wherein said reference generating means is connected to said air-conditioning detecting means for increasing said reference speed in response to the output indicative of the engagement of said air-conditioning apparatus with said engine.

3. An apparatus according to claim 1, wherein said second control means is connected to increase said reference speed in response to the output indicative of said intake pressure being below said predetermined value.

4. An apparatus according to claim 1 further comprising:

integrating means for integrating said comparator signal provided by said comparing means;

periodic signal generating means for generating periodic signals at a fixed frequency; and second comparing means for comparing the output of said integrating means with said periodic signals, the comparison output of said second comparing means being applied to said air control valve means.

5. An air intake control system for an automobile engine comprising:

an air intake tube for flowing air to said engine;

a throttle valve provided in said air intake tube;

an air passage bypassing said throttle valve;

an air control valve means provided in said bypassing air passage for controlling flow rate of bypass air;

an electromagnetic mechanism for controlling said air control valve means;

an engine speed sensor for detecting the speed of rotation of said engine and generating an engine speed signal related thereto;

a pressure sensor for detecting the pressure of the air intake tube downstream of the throttle valve and generating a pressure signal related thereto;

a function voltage generator circuit for generating a function voltage corresponding to a desired idling speed of rotation;

a closed loop control circuit for regulating the energization of said electromagntic mechanism by comparing the engine speed signal with said function voltage and generating a control circuit signal related to the difference of said signals, said control circuit signal being coupled to said electromagnetic mechanism, thus regulating the idling speed of rotation of said engine at said desired idling speed of rotation; and a command circuit impressed with the pressure signal for regulating the energization of said electromagnetic mechanism said regulating overriding the regulation by said closed loop control circuit in a manner such that said pressure in said air intake tube is substantially maintained at a predetermined value during deceleration of the automobile.

6. An air intake control system for the engine according to claim 5, wherein said function voltage generator circuit is constructed in a manner to generate a function voltage in accordance with the output of an air-conditioning switch and the output of a warm-up sensor for detecting the engine warm-up condition; and said closed loop control circuit further includes a D-A converter coupled between said speed sensor and said comparator for producing an analog voltage by D-A conversion of the detection signal of said engine speed sensor, an integrator circuit for integrating the output signal of said comparator circuit, and an amplifier circuit for controlling the energization of said electromagnetic mechanism in accordance with the output signal of said integrator circuit.

7. An air intake control system for the engine according to claim 6, wherein the control of the energization of said electromagnetic mechanism by said command circuit is effected by controlling the input voltage to said comparator circuit by said command circuit.

8. An air intake control system for the engine according to claim 5, further including fuel supply means comprising:

an air flowmeter provided upstream of said throttle valve for measuring the whole intake air flow rate and providing an electrical signal in accordance therewith;

an electronic fuel control unit for calculating a least amount of fuel injection in response to the electrical signal output of said air flowmeter to output fuel injection signal; and a fuel injection valve for injecting fuel in response to the output signal of said electronic fuel control unit.

9. A speed control apparatus for an engine having a throttle for controlling the amount of air flowing into the engine and fuel supply means for applying fuel to the engine in accordance with the amount of air flowing thereto, comprising:

an air passage, bypassing the throttle;

a valve disposed within said air passage for controlling the amount of air flow through said air passage, thereby controlling the amount of air bypassing said throttle;

means for sensing the temperature of the engine and generating a temperature signal related thereto;

means for sensing the rotational speed of the engine and generating an actual speed signal related thereto;

means for detecting the open/closed state of said throttle and generating a throttle signal related thereto;

means for generating a desired speed signal representative of a desired speed of said engine;

means for sensing pressure downstream of said throttle and generating a pressure signal related thereto;

means for comparing said actual and desired speed signals and generating a control signal for controlling said valve;

first control means, responsive to said throttle signal for selectively inhibiting the control of said valve by said control signal;

second control means, responsive to said pressure signal for causing said valve to increase or decrease the amount of bypass air flowing therethrough in response to the detected pressure, as represented by said pressure signal, being below or above a predetermined valve, respectively, the control provided by said second control means overriding the control provided by said first control means.

10. An apparatus according to claim 9 further including, for engines working in conjunction with an air-conditioner, means for detecting whether the air-conditioner is ON or OFF and providing an air-conditioning signal related thereto, said air-conditiong signal being coupled to said means for generating a desired speed signal for increasing the desired speed when said air-conditioner is ON.

11. An apparatus according to claim 9 wherein sad second control means causes said valve to allow an increase in the flow of bypass air whenever the pressure is below a predetermined level.

12. An apparatus according to claim 9 further comprising:

an integrator coupled to the output of said means for comparing;

means for generating a signal having a predetermined frequency; and a second means for comparing the output of said means for generating with the output of said integrator, the output of said second comparator being applied to said valve.

13. An air intake control system for an automobile engine comprising:

an air intake tube for flowing air to said engine;

a throttle valve provided in said air intake tube;

an air passage bypassing said throttle valve;

a fuel supply means for supplying said engine with fuel in accordance with the whole amount of air flowing into said engine through both the throttle valve and the air passage bypassing the throttle valve;

an air control valve provided in said bypassing air passage for controlling the flow rate of bypass air;

an electromagnetic mechanism for controlling said air control valve;

an engine speed sensor for detecting the speed of rotation of said engine and for generating an engine speed signal related thereto;

a pressure sensor for detecting the pressure at the air intake tube downstream of the throttle valve and for generating a pressure signal related thereto;

a function voltage generator circuit for generating a function voltage corresponding to a desired idling speed of rotation of said engine;

a closed loop control circuit for regulating the energization of said electromagnetic mechanism by comparing the engine speed signal with said function voltage and generating a control circuit signal related to the differences of said signals, said control circuit signal being coupled to said electromagnetic mechanism, thus regulating the idling speed of rotation of said engine at said desired idling speed of rotation; and a command circuit impressed with said pressure signal for regulating the energization of said electromagnetic mechanism, said regulating overriding the regulation provided by said closed loop control circuit in a manner such that the pressure in said air intake tube is substantially maintained at a predetermined value during deceleration of the automobile.

14. An air intake control system according to claim 13 wherein said fuel supply means comprises:

an air flow meter provided upstream of said throttle valve for measuring the whole intake air flow rate and providing an electrical signal in accordance therewith;

an electronic fuel control unit for calculating a desired amount of fuel injection in response to the output signal of said air flow meter and providing an output fuel injection signal related thereto; and a fuel injection valve for injecting fuel in response to the output fuel injection signal from said electronic fuel control unit.

* * * * *